US005883643A

United States Patent [19]

Mok et al.

[11] Patent Number: 5,883,643

[45] Date of Patent: Mar. 16, 1999

[54] DEVICE AND METHOD FOR PRINTING MARKINGS ON FLAT CONSIGNMENTS

[75] Inventors: Josef Mok; Uwe Märtin, both of Constance, Germany

[73] Assignee: Licentia Patent-Verwaltungs-GmbH, Frankfurt, Germany

[21] Appl. No.: 737,359

[22] PCT Filed: Mar. 7, 1996

[86] PCT No.: PCT/EP96/00975

§ 371 Date: Jan. 30, 1997

§ 102(e) Date: Jan. 30, 1997

[87] PCT Pub. No.: WO96/28374

PCT Pub. Date: Sep. 19, 1996

[30] Foreign Application Priority Data

Mar. 9, 1995 [DE] Germany ........................ 195 08 180.3

[51] Int. Cl.[6] ..................................................... G01D 15/18

[52] U.S. Cl. ............................ 347/4; 347/104; 101/407.1

[58] Field of Search ................................. 271/3.21, 3.22, 271/3.23, 197, 198, 194; 347/104; 101/135, 407.1, 474, 662; 400/662

[56] References Cited

U.S. PATENT DOCUMENTS

| | | | |
|---|---|---|---|
| 4,207,579 | 6/1980 | Gamblin et al. | 347/104 |
| 4,447,817 | 5/1984 | Naramore | 347/104 |
| 5,094,554 | 3/1992 | Hurd et al. | 400/59 |

FOREIGN PATENT DOCUMENTS

| | | |
|---|---|---|
| 4035357 | 5/1991 | Germany . |
| 2272401 | 5/1994 | United Kingdom . |

*Primary Examiner*—N. Le
*Assistant Examiner*—Anh T. N. Vo
*Attorney, Agent, or Firm*—Venable; Gabor J. Kelemen

[57] ABSTRACT

An apparatus for printing on flat items during conveyance thereof in an item advancing direction include a perforated transport belt having a width, an outer face and an inner face. The outer face is oriented toward a first side of the perforated transport belt and the inner face is oriented toward a second side of the perforated transport belt. A cover belt is superposed on the inner face of the perforated transport belt for holding by friction an item sandwiched between the perforated transport belt and the cover belt. A drive moves the perforated transport belt and the cover belt together in the item advancing direction. A vacuum device extends along the outer face of the perforated transport belt on the first side thereof for pressing the item, sandwiched between and advanced by the perforated transport belt and the cover belt, with a pressing force against the inner face of the cover belt in a direction substantially perpendicular to the item advancing direction. A print head is disposed laterally externally of the width of the perforated transport belt on the first side thereof for printing on the advancing item, and a slide member is in engagement with the outer face of the perforated transport belt and guides the item past the print head.

7 Claims, 2 Drawing Sheets

DEVICE AND METHOD FOR PRINTING MARKINGS ON FLAT CONSIGNMENTS

BACKGROUND OF THE INVENTION

The invention relates to a device and a method for printing markings on flat items (also referred to as consignments) wherein the items are conveyed to a print head and during printing are exposed to a vacuum force.

Mechanical printers can be used to cancel stamps, wherein the stamp layout, however, is very limited. Alternatively, it is possible to use non-contacting printing systems, in particular ink jet printers, with which high printing qualities can be achieved and for which a free design of the stamp layout is possible. Of advantage with this system is the lower wear as compared to mechanical systems. Particularly attractive is the use of printing systems that permit a free design of the stamp layout if stamps are to be canceled on one side of a consignment and advertisement is to be printed onto the same side or on the other side. In such a case, the advertisement logos can change from consignment to consignment, so that different clients can be addressed, depending on the point of destination.

In order to achieve a high printing quality, it is necessary with ink jet printers that the consignments are transported past the print heads at a preset distance, e.g. 0.5 mm, and with as little disturbance as possible. It is important here that the consignments are transported at a predetermined speed that is synchronized with the control for the print heads. The problem of a speed difference between the conveying belts and the consignments exists, in particular if the consignments are transported via conveyor belts that are arranged in pairs one above the other, between which the consignments are pulled along frictionally engaged. Such a speed difference is particularly disadvantageous if a uniform marking must be applied to the consignment by different print heads, which are arranged one after another and which print with a time delay.

SUMMARY OF THE INVENTION

It is thus the object of the invention to provide an improved device and a method, with which a safe and quiet transport of the consignments at a preset distance from the print heads is achieved.

This object and others to become apparent as the specification progresses, are accomplished by the invention, according to which, briefly stated, the apparatus for printing on flat items during conveyance thereof in an item advancing direction include a perforated transport belt having a width, an outer face and an inner face. The outer face is oriented toward a first side of the perforated transport belt and the inner face is oriented toward a second side of the perforated transport belt. A cover belt is superposed on the inner face of the perforated transport belt for holding by friction an item sandwiched between the perforated transport belt and the cover belt. A drive moves the perforated transport belt and the cover belt together in the item advancing direction. A vacuum device extends along the outer face of the perforated transport belt on the first side thereof for pressing the item, sandwiched between and advanced by the perforated transport belt and the cover belt, with a pressing force against the inner face of the cover belt in a direction substantially perpendicular to the item advancing direction. A print head is disposed laterally externally of the width of the perforated transport belt on the first side thereof for printing on the advancing item, and a slide member is in engagement with the outer face of the perforated transport belt and guides the item past the print head.

DESCRIPTION OF THE PREFERRED EMBODIMENTS

Figure 1:
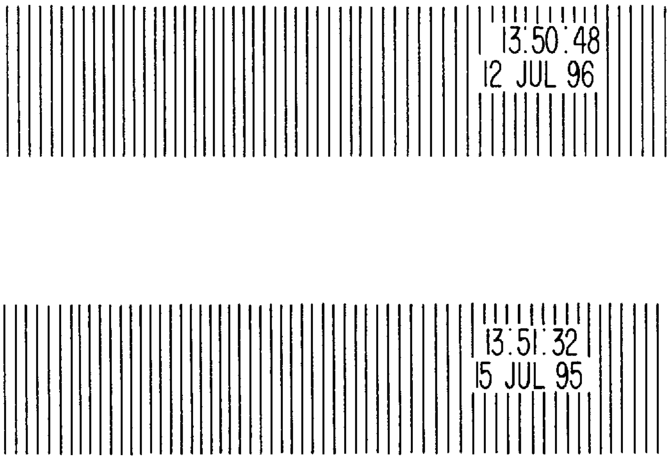
FIG. 1 is an example of a print placed with the correct time delay and a print not placed with the correct time delay by two print heads that print with a time delay.

FIG. 1 shows the differences between prints placed with a correct and an incorrect time delay by two print heads that print with a time delay. The latter shows a displacement of the two printed images against each other. Such a displacement occurs with otherwise correct actuation of the print heads if there was slippage between the consignments and the conveying belts used for the transport.

Figure 2:
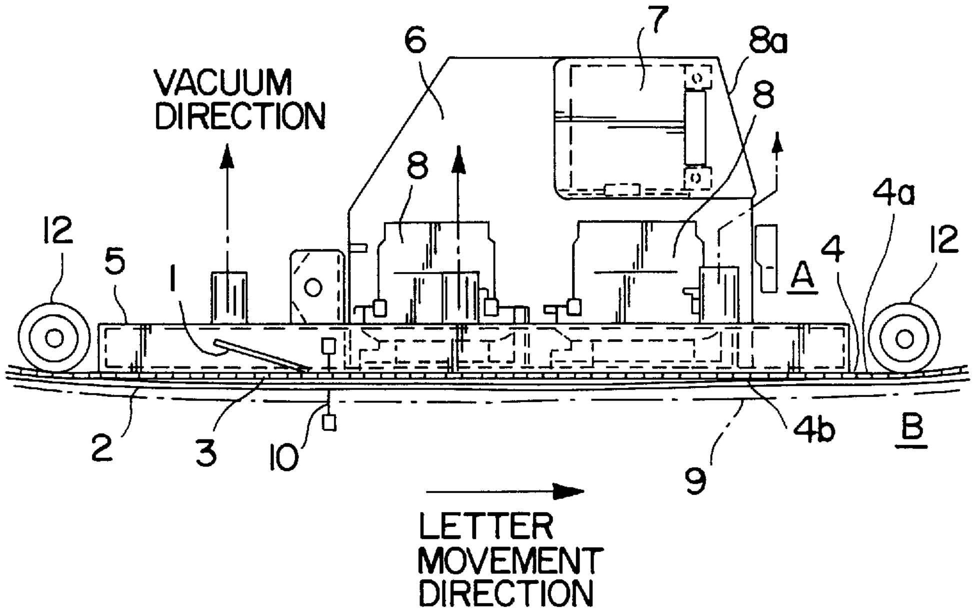
FIG. 2 is a view from above of a device according to the invention.
Figure 3:
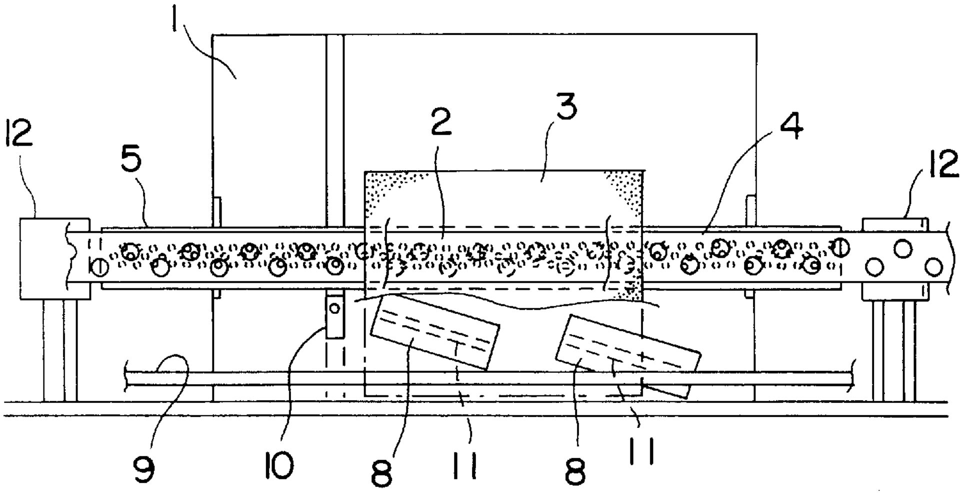
FIG. 3 is a view from the side of a device according to the invention.

The FIGS. 2 and 3 show a preferred embodiment of a device according to the invention in a view from above and from the side. In this case, a sliding element 1 is arranged such that the consignment 3 that is conveyed between a cover belt 2 and a perforated transport belt 4, arranged in pairs, is transported at a predetermined distance past the print heads 8. The perforated transport belt 4 has an outer face **4*a* oriented towards a side A of the belt 4 and an inner face 4*b* oriented towards a side B of the belt 4. The belts 2 and 4 are in a superposed relationship such that a face of the belt 2 is oriented towards the inner face 4*b* of the belt 2. In addition to the two print heads 8 shown in this embodiment, the printing station 8*a* also has ink containers 7 as well as an ink supply system and a cleaning pump which, however, are not shown in detail in the following. The printing stations are controlled by an electronic magazine feed attachment. Two printing stations are preferably used, wherein each station prints on one side of a consignment. A light barrier 10 is used to control the start of the printing. An arriving consignment triggers the printing signal via this light barrier. In this case, the first print head starts printing first. The second print head starts to print with a time delay. The start of the printing operations must here be coordinated such that a uniform picture is created. The control of the printing operation is preferably synchronized with a timer that is operated by the conveyor belt 4. For this, the distance of the light barrier 10 to the first print head or the second print head is converted to a number of cycles. The printing starts when the respective number of cycles is reached. This, in turn, corresponds to a certain path. The printing operation itself is controlled directly by the timer. Since the control of the printing operation depends on the path, it is of no significance at what speed the consignments travel. It is preferable if the print heads are ink jet printers. A pixel plate is here installed in the print heads, inside of which nozzles 11** are arranged such that a predetermined number of these produce one each pixel on the material to be printed on.

A linear arrangement of nozzles is preferably used; although it is possible to use matrix or other arrangements as well. In order to obtain a uniformly printed picture from two print heads, these must be spatially displaced and vertically arranged, at a predetermined angle α. The distance between the light barrier 10 and the respectively first nozzles of the respective print head is fed to an electronic computer as delay. The computer converts the path into cycles. The printing start for the print heads can be adjusted respectively by changing the delay.

Cover belt 2 and perforated transport belt 4 move around rollers 12, between which the device is arranged. The rollers 12 cause a closing of the spreading that has occurred between cover belt 2 and perforated transport belt 4.

In accordance with FIGS. 2 and 3, a letter-holding force exists between the conveyor belts, that is the cover belt 2 and the transport belt 4, which force depends on the friction coefficient $\mu$ and the normal force FN. This normal force generally is composed of two components, the normal force $FN_1$ resulting from the stretching of the transport belts and the normal force $FN_2$ resulting from the prestressing of the belts. The following applies:

$$FR=J\cdot\mu\ (FN_1+FN_2).$$

The factor J describes the number of pairs of frictional surfaces, J=2. The magnitude of the normal force is determined by the spreading apart of the conveying belts by the letter. Such spreding leads to a stretching of the belts. In front of and behind the consignment, the spreading of the conveying belts is closed by the rollers 12. In addition, the magnitude of the normal force that has appeared as a result of the spreading apart is determined by the distance between these two rollers. Since the device for printing is arranged between the rollers 12, the distance between the rollers is not long enough to have a subtantial slippage during a conveying of the consignment.

FIGS. 2 and 3 show a vacuum device 5 that is essentially arranged in the area of the print heads. This vacuum device preferably extends in a linear direction into the range of the rollers 12 on both sides of the printing station 6, which is arranged between the rollers 12.

The vacuum device 5 has an opening that is adjusted to the cover belt 2 and the perforated transport belt 4, so that the consignments are pressed by the vacuum pressure against the inner face 4*b* of the transport belt 4. This is made possible by the fact that the transport belt 4 lies against the sliding element 1, which extends across the vacuum device. The opening is preferably designed as a perforated plate. The outer face 4*a* of the belt 4 is oriented toward the vacuum device 5 and the print heads 8 which are thus situated on side A of the belts 4.

The vacuum device 5 extends farther than the sliding element 1 to ensure the longest possible guidance of the consignment. It is preferable if the opening of the vacuum device is adopted to the cover belt 2 and transport belt 4 in such a way that the consignments are pressed by the vacuum pressure against the perforated belt, but that the holes in the perforated transport belt are closed if no consignment is in front of the vacuum pressure device.

The vacuum pressure device causes an increase in the normal pressure on the consignments because the consignments are drawn in by the transport belt 4 that runs over the sliding element 1.

The moving force thus becomes:

$$F_R=j\cdot\mu\cdot(F_{N1}+FN_{N2}+F_s),$$

wherein FS stands for the normal force generated by the vacuum device. The magnitude of the additional normal force is higher by at least a factor of 10 than the respective forces generated by the conveying belts alone.

Figure 4:
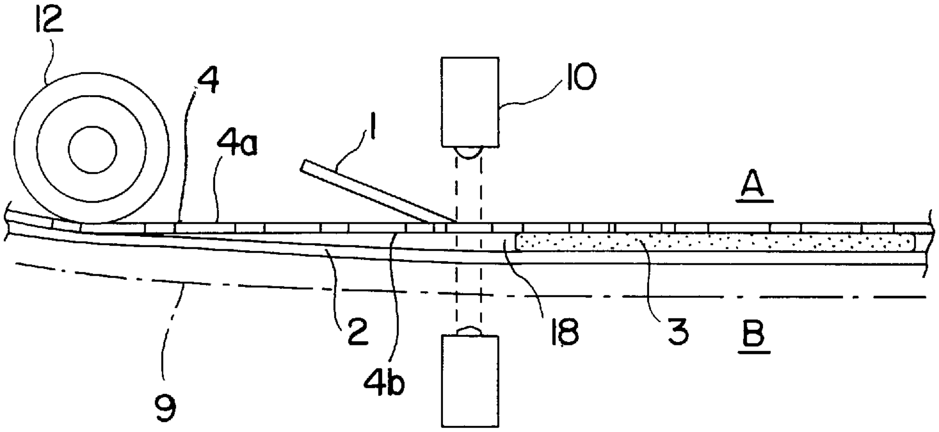
FIG. 4 is a detailed illustration of the opening time for a thick consignment.

In FIG. 4, a situation is shown where a thicker consignment is wedged in between the perforated transport belt 4 there and the cover belt 2. During the normal operation, the opening of the vacuum device is closed off by the consignment and the cover belt 2. However, if a thick consignment is wedged between the belts 2 and 4, an opening wedge 18 may form before and after the consignment. In that case, the cover belt 2 cannot close the wedge 18, meaning that holes in the transport belt $F_4$ are not covered. This results in a leak, leading to a lowering of the pressure.

Figure 5:
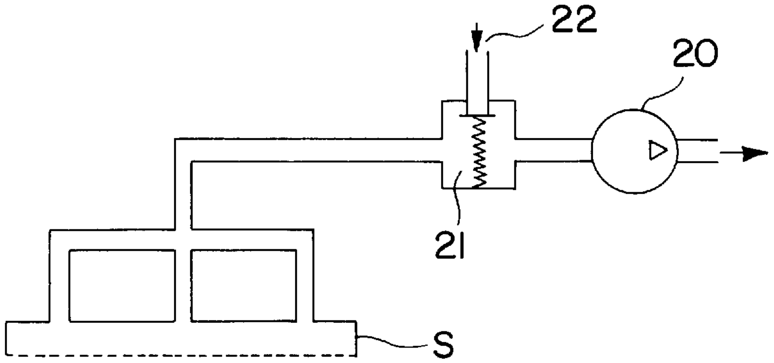
FIG. 5 is an embodiment of a vacuum pressure adjustment device for maintaining a constant normal force on the consignment.

FIG. 5 shows a diagram of a vacuum pressure adjustment apparatus connected to the vacuum device. A vacuum pressure is generated at the pump 20, which is maintained constant by the suction relief valve 21. If a specific vacuum pressure is reached, the suction relief valve opens and air is sucked in via a bypass 22. The vacuum pressure remains constant. If the pressure collapses due to a leak, the bypass 22 is closed. Since a large volume of air flow is present, only insignificant pressure fluctuations exist.

In order to obtain a uniformly good printing quality, a round belt 9 is provided in addition to the already mentioned conveying belts to additionally press the consignments in the lower part against the sliding element 1. This is expedient, in particular if the conveying belts 2 and 4 are above the print heads, as shown in FIG. 3. An additional quieting of the consignment and a higher printing quality are achieved with the round belt 9. The round belt 9 is preferably coupled with the transport belt 4.

We claim:

1. An apparatus for printing on flat items during conveyance thereof in an item advancing direction, comprising (a) a perforated transport belt having a width, an outer face and an inner face; said outer face being oriented toward a first side of said perforated transport belt and said inner face being oriented toward a second side of said perforated transport belt;

(b) a cover belt superposed on said inner face of said perforated transport belt for holding by friction an item sandwiched between said perforated transport belt and said cover belt;

(c) drive means for moving said perforated transport belt and said cover belt together in said item advancing direction;

(d) a vacuum device extending along said outer face of said perforated transport belt on said first side thereof for pressing the item, sandwiched between and advanced by said perforated transport belt and said cover belt, with a pressing force against said inner face of said cover belt in a direction substantially perpendicular to said item advancing direction;

(e) a print head disposed laterally externally of said width of said perforated transport belt on said first side thereof for printing on the item advanced by said perforated transport belt and said cover belt; and (f) a slide member being in engagement with said outer face of said perforated transport belt and guiding the item past said print head as the item being carried by said perforated transport belt and said cover belt.

2. The apparatus as defined in claim 1, wherein said perforated transport belt has a field of perforation holes; further wherein said cover belt fully covering said field in an absence of an item between said perforated transport belt and said cover belt.

3. The apparatus as defined in claim 1, wherein said slide member is arranged such that the item moves past said print head at a predetermined distance therefrom.

4. The apparatus as defined in claim 1, wherein said vacuum device includes a vacuum pressure setting device for maintaining said pressing force constant.

5. The apparatus as defined in claim 1, wherein said printer head is an ink jet printer.

6. The apparatus as defined in claim 1, wherein said print head is arranged at an inclined angle to said item advancing direction.

7. A method of printing on a flat item, comprising the following steps:

(a) advancing the flat item through a working zone of a print head in a conveying direction;

(b) generating a vacuum;

(c) pressing the item by a force derived from the vacuum towards the print head substantially perpendicularly to said conveying direction; and (d) while performing steps (a), (b) and (c), printing on the item by said print head.

* * * * *